(12) United States Patent
Grelle et al.

(10) Patent No.: US 12,166,388 B2
(45) Date of Patent: Dec. 10, 2024

(54) INDUCTIVELY ELECTRICALLY EXCITED SYNCHRONOUS MACHINE

(71) Applicant: MAHLE International GmbH, Stuttgart (DE)

(72) Inventors: Thorsten Grelle, Stuttgart (DE); Peter Kozlowski, Stuttgart (DE); Penyo Topalov, Stuttgart (DE); Philipp Zimmerschied, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/708,164

(22) PCT Filed: Oct. 18, 2022

(86) PCT No.: PCT/EP2022/078934
§ 371 (c)(1),
(2) Date: May 7, 2024

(87) PCT Pub. No.: WO2023/078667
PCT Pub. Date: May 11, 2023

(65) Prior Publication Data
US 2024/0339904 A1    Oct. 10, 2024

(30) Foreign Application Priority Data

Nov. 8, 2021   (DE) .................. 102021212547.6

(51) Int. Cl.
*H02K 19/36* (2006.01)
*H01F 38/18* (2006.01)
(Continued)

(52) U.S. Cl.
CPC ............ *H02K 19/36* (2013.01); *H01F 38/18* (2013.01); *H02K 11/20* (2016.01); *H02K 19/12* (2013.01); *H02K 19/26* (2013.01)

(58) Field of Classification Search
CPC ........ H02K 19/36; H02K 11/20; H02K 19/12; H02K 19/26
See application file for complete search history.

(56) References Cited

U.S. PATENT DOCUMENTS 8,508,179 B2    8/2013   Schmidt
10,862,374 B2   12/2020  Sudan
(Continued)

FOREIGN PATENT DOCUMENTS

CN    112928956 A      6/2021
DE    102008032210 A1  1/2010
(Continued)

OTHER PUBLICATIONS

EP-3672065-A1, Ebersberger, all pages (Year: 2020).*
(Continued)

*Primary Examiner* — Naishadh N Desai
(74) *Attorney, Agent, or Firm* — Fishman Stewart PLLC

(57) ABSTRACT

An inductively electrically excited synchronous machine is disclosed. The synchronous machine includes a rotor including at least one rotor coil for generating a magnetic rotor field, a stator, on which the rotor is rotatably mounted about an axis of rotation, and including at least one stator coil for generating a magnetic stator field, and a rotary transformer for inductively transmitting electrical energy to the at least one rotor coil. The rotary transforming includes at least one stator-fixed transformer primary coil and at least one rotor-fixed transformer secondary coil. A machine controller is coupled to the stator coil and to the at transformer primary coil for operation as a motor and/or as a generator. A demagnetizing circuit is provided that includes at least one dynamo winding arranged on the stator. The demagnetizing circuit has at least one switching device for activating and deactivating the demagnetizing circuit.

13 Claims, 1 Drawing Sheet

(51) Int. Cl.
*H02K 11/20* (2016.01)
*H02K 19/12* (2006.01)
*H02K 19/26* (2006.01)

(56) References Cited

U.S. PATENT DOCUMENTS

2006/0181251 A1* 8/2006 Velhner .................. H02P 9/302
322/59
2014/0176087 A1* 6/2014 Mouni .................... H02P 9/102
322/59

FOREIGN PATENT DOCUMENTS

| | | | |
|---|---|---|---|
| DE | 102010042052 A1 | 4/2012 | |
| DE | 102014209607 A1 | 11/2015 | |
| DE | 102016207392 A1 | 11/2017 | |
| EP | 3672065 A1 * | 6/2020 | ............. H02P 25/22 |
| WO | 2011086513 A1 | 7/2011 | |
| WO | 2012123847 A2 | 9/2012 | |
| WO | 2019157626 A1 | 8/2019 | |

OTHER PUBLICATIONS

English abstract for CN-112928956.
English abstract for DE-102016207392.
English abstract for DE-102010042052.

* cited by examiner

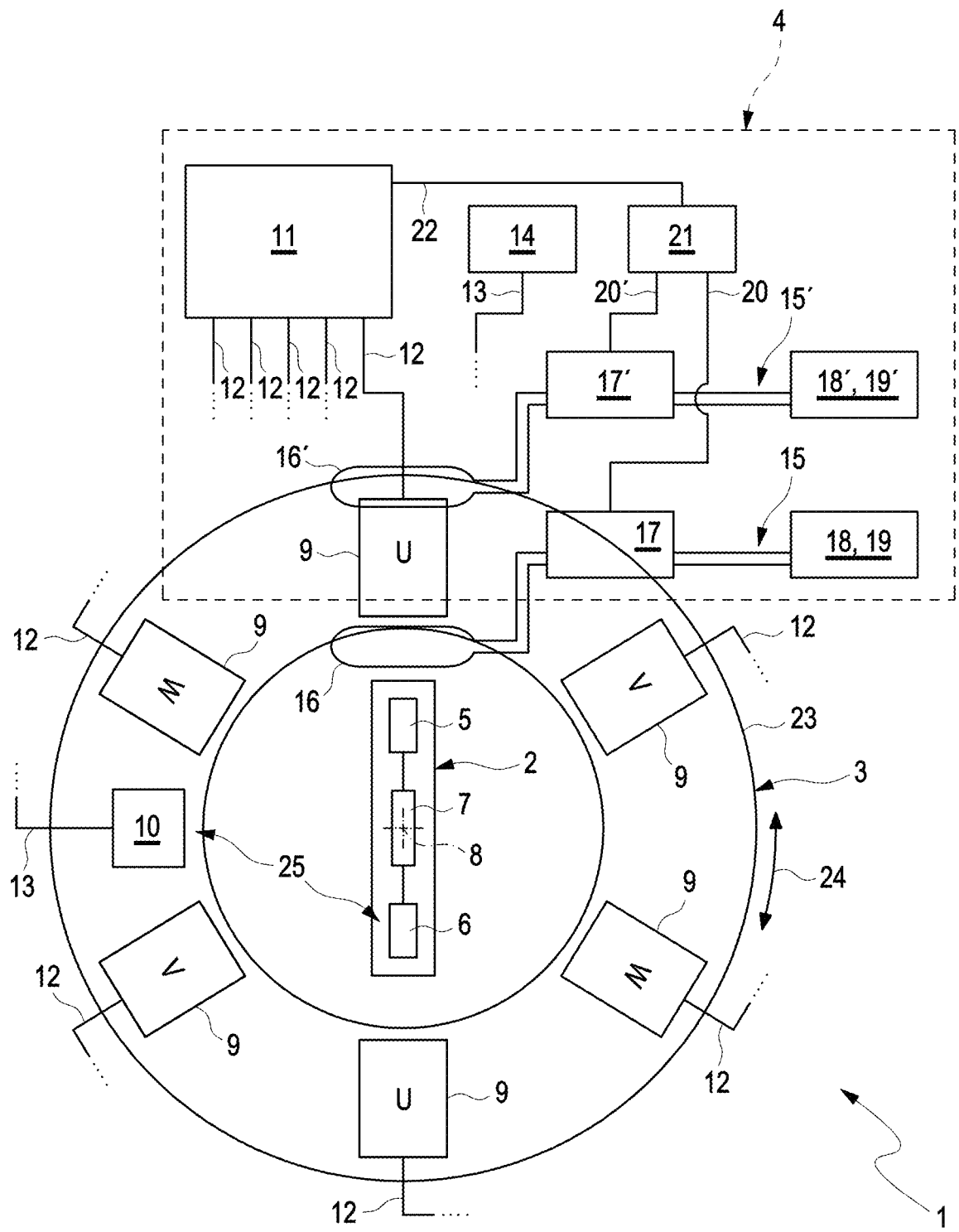

INDUCTIVELY ELECTRICALLY EXCITED SYNCHRONOUS MACHINE

CROSS-REFERENCE TO RELATED APPLICATIONS

This application claims priority to International Patent Application No. PCT/EP2022/078934 filed Oct. 18, 2022, which also claims priority to Germany Patent Application DE 10 2021 212 547.6 filed Nov. 8, 2021, each of which is hereby incorporated by reference in its entirety.

TECHNICAL FIELD

The present invention relates to an inductive electrically excited synchronous machine.

A synchronous machine is a rotating electrical machine, in which a rotor rotates or runs, respectively, synchronously with a rotating field of a stator during the operation. A synchronous machine can generally be operated as motor or as generator. In the case of an electrically excited or externally excited synchronous machine, a magnetic field is additionally generated electrically on the rotor. At least one rotor coil is used thereby, which has to be supplied with electrical energy, in particular in the form of direct current, in order to generate the rotor-side magnetic field. In the case of an inductively electrically excited synchronous machine, the supply of the electrical energy to the respective rotor coil takes place in a brushless manner, namely by means of induction. An inductively electrically excited synchronous machine thereby corresponds to a brushless externally excited electrical synchronous machine.

BACKGROUND

A conventional inductively electrically excited synchronous machine is known, e.g., from the DE 10 2016 207 392 A1. This synchronous machine comprises a rotor, which has at least one rotor coil for generating a magnetic rotor field. The synchronous machine additionally has a stator, on which the rotor is rotatably mounted about an axis of rotation and which has at least one stator coil for generating a magnetic stator field. The synchronous machine is additionally equipped with a rotary transformer, by means of which electrical energy can be inductively transmitted to the at least one rotor coil. For this purpose, the rotary transformer has a stator-fixed transformer primary coil and a rotor-fixed transformer secondary coil. The transformer secondary coil is electrically connected to the respective rotor coil, expediently via a rectifier. The synchronous machine is furthermore equipped with a machine controller, which is coupled to the respective stator coil and to the respective transformer primary coil for operating the synchronous machine as motor and/or as generator.

In the event of a machine fault, which can occur in the case of one of the components of the synchronous machine, for example within the coils of rotor and stator or within the electronics of the machine controller, including an inverter, the synchronous machine is turned off or deactivated, respectively. This can take place, for example, by ending the supply of electrical energy to the respective stator coil as well as to the respective transformer primary coil. To avoid an abrupt blocking of the rotor in the stator or to avoid supercritical currents and voltages in the coils, respectively, it is required to demagnetize the respective rotor coil in the event of a machine fault.

In the case of the known, above-mentioned DE 10 2016 207 392 A1, it is proposed to provide a braking circuit on the rotor side, which comprises a switching element, a control circuit and a load element. As soon as the voltage exceeds a predetermined threshold value in the event of a machine fault, for example due to the deactivation of the stator coils, the switching element opens and dissipates the electrical energy via the load element, in that the electrical energy is converted into heat. The reaction time of a rotor-side braking circuit of this type is comparatively large because an increase of the voltage to the threshold value has to take place first. High-performance synchronous machines are furthermore already subjected to a high thermal stress, so that the heat additionally generated on the load element cannot be dissipated or can only be dissipated insufficiently, so that a thermal overloading of electronic components of the braking circuit and thus of the rotor or of the synchronous machine, respectively, can thus occur.

Another inductively electrically excited synchronous machine is known, e.g., from the WO 2012/123847 A1.

An electrically excited synchronous machine is known from the EP 3 672 065 A1, which has two independent stator coils, which can be operated separately for generating rotating magnetic stator fields. During normal operation, both stator coils are controlled so that the two stator fields rotate in the same direction of rotation. In a dissipation operation, the two stator coils are operated, in contrast, so that the two stator fields rotate in the opposite direction and cancel each other out. The kinetic and electrical energy of the machine is thus reduced, without current flowing back to the inverter. The permanent magnets can thus advantageously be protected against a demagnetization due to excessive electromagnetic fields.

The WO 2019/157626 A1 discloses a dynamo of a wind power plant comprising two separate stator coils, which during normal operation, convert the rotating magnetic field generated by means of the permanent magnets, into electrical energy. In the event of a fault in the one stator coil, the other stator coil is controlled, so that this generates a magnetic flux, which counteracts the magnetic flux of the faulty stator coil. A strong electromagnetic field can be avoided thereby, which can lead to a demagnetization of the permanent magnets.

A multi-phase electrical machine is known from the CN 112 928 956 A.

The present invention deals with the problem of specifying an improved or at least another embodiment for an inductively electrically excited synchronous machine, in the case of which in particular the demagnetization of the respective rotor coil can be performed quickly and without overheating in the event of a machine error.

This problem is solved according to the invention by means of the subject matter of the independent claim. Advantageous embodiments are subject matter of the dependent claims.

SUMMARY

The invention is based on the general idea of inductively performing the demagnetization of the respective rotor coil in the event of a machine error. For this purpose, at least one dynamo winding is arranged on the stator, which is provided on the stator in addition to the respective stator coil and in addition to the respective transformer primary coil. The rotor field of the rotor can thereby be dissipated inductively from the rotor in the form of electrical energy. It is possible thereby, for example, to convert the energy dissipated by means of the demagnetization of the at least one rotor coil into heat outside of the rotor or to store it. An additional heat input into electronic components of the rotor can thus be avoided. It is furthermore possible to systematically bring about this functionality with the help of the motor controller, thus quasi simultaneously with the deactivation of the synchronous machine. As a result, this demagnetization can respond more quickly and can perform the demagnetization as a whole more quickly. In other words, the machine controller is designed in such a way according to the invention that it demagnetizes the respective rotor coil in the event of a machine fault of the synchronous machine.

In detail, the invention proposes to equip the synchronous machine with a stator-side demagnetizing circuit, which has at least one dynamo winding on the stator. The respective dynamo winding is thereby present on the stator in addition to the respective stator coil and in addition to the respective transformer primary coil. The respective dynamo winding is designed and arranged so that the rotor field can induce a voltage in the respective dynamo winding, whereby the rotor can ultimately be demagnetized. Expediently, several dynamo windings can be provided, which are arranged on the stator so as to be distributed, in particular evenly, in the circumferential direction. The respective dynamo winding can thereby be arranged on the stator radially on the inside or radially on the outside. The circumferential direction runs around the axis of rotation. The axis of rotation defines the longitudinal direction, which runs parallel to the axis of rotation. The radial direction is perpendicular to the axis of rotation.

According to the invention, it is provided that the respective load and/or the respective store is or are, respectively, arranged on the stator on the outside or outside of the stator. An overheating of the synchronous machine can be effectively avoided thereby.

The synchronous machine is preferably designed as drive motor or traction motor for a motor vehicle, which can in particular consume an electrical power of 100 kW to 240 kW, preferably of 120 KW to 160 KW, particularly preferably of approximately 140 kW.

A respective dynamo winding can in particular be provided for each stator coil, which are arranged on the stator so as to be distributed, in particular evenly, in the circumferential direction. An embodiment is thereby particularly advantageous, in the case of which a respective dynamo winding provided for each stator coil, which is arranged on the respective stator coil. The respective dynamo winding is then located exactly where an energy transmission is to be avoided, namely into the respective stator winding. In the case of 1, 2, 3 or n stator coils, 1, 2, 3 or n dynamo windings are then provided. The number of dynamo windings then corresponds to the number of the stator coils.

The demagnetization circuit is furthermore equipped with at least one electrical energy load and/or with at least one electrical energy store. The demagnetization circuit proposed here is additionally equipped with at least one switching means for activating and deactivating the demagnetization circuit or the respective dynamo winding, respectively. In the present context, the "activating" of the respective dynamo winding means that a circuit, which connects the respective dynamo winding to the respective load or store, respectively, is closed, so that current can flow therein, while the "deactivating" of the respective dynamo winding means that the circuit, which connects the respective dynamo winding to the respective load or store, respectively, is open, so that no current flow therein. In this respect, this is equivalent to the switching means being designed for activating and deactivating the demagnetization circuit. Within the demagnetization circuit, the respective load or the respective store, respectively, is connected to the respective dynamo winding via the respective switching means so that electrical energy, which is fed into the demagnetization circuit via the respective activated dynamo winding by means of induction, is supplied to the respective load or the respective store, respectively. In the case of activated dynamo winding, electrical energy fed in there by induction can thus be dissipated to the respective load or store, respectively. The motor controller is coupled to the respective switching means and is configured so that it controls the respective switching means to deactivate the demagnetization circuit or the respective dynamo winding, respectively, during normal operation of the synchronous machine, while it controls the respective switching means to activate the demagnetization circuit or the respective dynamo winding, respectively, in the event of a machine fault. When a machine fault occurs, the machine controller can thus deactivate the respective stator coil and/or the respective transformer primary coil, e.g., by ending the current supply, and simultaneously activate the respective dynamo winding, so that the demagnetization circuit is active immediately in the event of a fault and can dissipate the energy from the rotor.

The stator usually has several stator windings, so that several dynamo windings are then also provided. The dynamo windings are expediently connected to one another within the demagnetization circuit so that they can jointly supply the respective load or the respective store, respectively, with electrical energy. This simplifies the setup of the demagnetization circuit.

A separate switching means can generally be provided for each dynamo winding. One switching means can likewise be assigned to several dynamo windings. A common switching means can expediently be provided for all dynamo windings.

In the case of an advantageous embodiment, the respective dynamo winding can be arranged on the respective stator coil radially on the inside. The radial direction runs perpendicular to the axis of rotation. Due to the positioning of the respective dynamo winding on the respective stator coil radially on the inside, the respective dynamo winding is located radially between stator and rotor and can be acted on directly by the rotor field. The induction on the respective dynamo winding is then particularly efficient.

In the case of another embodiment, it can be provided that the respective dynamo winding is arranged on the respective stator coil radially on the outside. The respective dynamo winding is thus located on an outer side of the stator, which simplifies the dissipation of the electrical energy from the respective dynamo winding to the respective load or store, respectively.

In the case of another advantageous embodiment, the synchronous machine can be designed in a multi-phase manner, in particular in a three-phase manner, wherein at least one stator coil is assigned to each phase. The synchronous machine accordingly has several stator coils. As a result, the demagnetization circuit also has several dynamo windings, namely one dynamo winding each for each stator coil.

In the case of another embodiment, the synchronous machine can be designed in a single-phase manner or in a multi-phase manner, wherein one coil group comprising two or more stator coils is assigned to each phase. In the special case, in which exactly two stator coils of the same phase form a coil group, this coil group forms a coil pair, in the case of which it can in particular be provided that the two corresponding stator coils lie diametrically opposite one another. One dynamo winding each is assigned to each stator coil. Two dynamo windings are then also assigned to each coil pair, namely one dynamo winding each for each stator coil of the coil pair.

Expediently, the two above-mentioned embodiments can be combined, so that the synchronous machine is designed in a multi-phase manner, preferably in a three-phase manner, wherein at least one coil pair of two stator coils lying diametrically opposite one another is assigned to each phase. Here, the number of the stator coils then also corresponds to the number of the dynamo windings. For example, a three-phase synchronous machine accordingly has three coil pairs comprising a total of six stator coils, so that this synchronous machine then also has six dynamo windings.

In the case of another embodiment, the respective load can be a thermocouple, which converts electrical energy into heat. For example, the respective load can have at least one electrical load element. Expediently, the respective load has several load elements of this type. A load element of this type can be, for example, an electrical resistor, a suppressor diode or a Zener diode.

In the case of a preferred embodiment, the machine controller can end the supply of electrical energy to the respective stator coil and/or to the respective transformer primary coil in the event of the machine fault. To turn off the synchronous machine, the supply of the electrical energy to the stator-side coils is thereby quasi turned off.

To be able to quickly reduce the stator field in the event of a fault, it can be provided according to an advantageous embodiment that the machine controller short-circuits the respective stator coil to end or when ending, respectively, the supply of electrical energy to the respective stator coil. The stator field quickly reduces in an energetically neutral manner by means of such a stator coil short circuit. The machine controller can optionally also short-circuit the respective transformer primary coil to end or when ending, respectively, the supply of electrical energy to the respective transformer primary coil.

Further important features and advantages of the invention follow from the subclaims, from the drawing and from the corresponding figure description on the basis of the drawings.

It goes without saying that the above-mentioned features and the features, which will be described below, cannot only be used in the respective specified combination, but also in other combinations or alone, without leaving the scope of the invention. Component parts of a higher-ranking unit mentioned above and to be named below, such as, e.g., of a means, of a device or of an assembly, which are identified separately, can form separate component parts or components, respectively, of this unit or can be integral regions or sections, respectively, of this unit, even if this is illustrated differently in the drawing.

BRIEF DESCRIPTION OF THE DRAWINGS

Preferred exemplary embodiment of the invention are illustrated in the drawing and will be described in more detail in the following description, whereby identical reference numerals refer to identical or similar or functionally identical components.

The sole FIG. 1 shows a highly simplified, circuit diagram-like schematic diagram of an inductively electrically excited synchronous machine.

DETAILED DESCRIPTION

According to FIG. 1, an inductively electrically excited synchronous machine 1 comprises a rotor 2, a stator 3 and a machine controller 4. The rotor 2 has at least one rotor coil 5 for generating a magnetic rotor field. The rotor 2 additionally has at least one transformer secondary coil 6 for supplying the rotor coil 5 with electrical energy. For this purpose, the rotor 6 can additionally be equipped with a rectifier 7, which converts alternating current coming from the transformer secondary coil 6 into direct current and supplies the latter to the rotor coil 5. The rotor 3 is rotatably mounted on the stator 3 about an axis of rotation 8. In the shown example, the rotor 2 is configured as internal rotor. However, an embodiment comprising a rotor 2, which is configured as external rotor, is generally also conceivable.

The stator 3 has at least one stator coil 9 for generating a magnetic stator field. The stator 3 additionally has at least one transformer primary coil 10 for inductively transmitting electrical energy to the respective transformer secondary coil 6. The respective transformer primary coil 10 and the respective transformer secondary coil 6 form a rotary transformer 25 for the inductive electrical external excitation of the rotor field. Deviating from the illustration of FIG. 1, the rotary transformer 25 is usually axially arranged on the synchronous machine 1. The transformer primary coil 10 is then located on the stator 3 on an axial front side of the synchronous machine 1, while the transformer secondary coil 6 is located on the rotor 2 on the same axial front side of the synchronous machine 1 and lies directly opposite to the transformer primary coil 10.

The machine controller 4 serves the purpose of operating the synchronous machine 1 as motor and/or as generator. For this purpose, the machine controller 4 can be equipped with an inverter means 11, which is connected to an electrical energy store, which is not shown here, such as, for example, a battery, and which can in particular include an inverter, which is not shown here. The machine controller 4 is coupled to the respective stator coil 9 via corresponding coil lines 12. In the shown example, the coil lines 12 are connected to the inverter means 11. The machine controller 4 is coupled to the respective transformer primary coil 10 via at least one transformer line 13. The respective transformer line 13 can thereby be connected to a transformer controller 14, which forms a part of the machine controller 4.

The machine controller 4 is now designed so that it demagnetizes the respective rotor coil 5 in the event of a machine fault of the synchronous machine 1. For this purpose, the machine controller 4 is equipped with a demagnetizing circuit 15, two alternative designs of which are illustrated simultaneously in FIG. 1, wherein the one variation is identified with 15 and the other variation with 15'. The same then also applies for components of the respective demagnetizing circuit 15 or 15', respectively.

The demagnetizing circuit 15 or 15', respectively, has at least one dynamo winding 16, 16'. Several dynamo windings 16, 16' are preferably provided, which are arranged on the stator 3 so as to be distributed in the circumferential direction 24 suggested by means of a double arrow. In the example shown here of a preferred embodiment, the demagnetizing circuit 15, 15' has one dynamo winding 16 or 16' each, respectively, for each stator coil 9. In the example of FIG. 1, the stator 3 has several stator coils 9. Each of these stator coils 9 is in each case equipped with one such dynamo winding 16 or 16', respectively. However, the corresponding dynamo winding 16, 16' for only one stator coil 9 is illustrated in FIG. 1, representative for all stator coils 9. The demagnetizing circuit 15, 15' has at least one switching means 17 or 17', respectively, which serves the purpose of activating and deactivating the demagnetizing circuit 15, 15' or the respective dynamo winding 16, 16', respectively. A common switching means 17, 17' for activating and deactivating all dynamo windings 16, 16' is preferably provided. The demagnetizing circuit 15, 15' is further equipped with at least one electrical energy load 18, 18' and/or with at least one electrical energy store 19, 19'. The respective load 18, 18' or the respective store 19, 19', respectively, is connected to the respective dynamo winding 16, 16' within the demagnetizing circuit 15, 15' via the respective switching means 17, 17'. This connection is thereby configured so that electrical energy, which is induced in the respective activated dynamo winding 16, 16', is supplied to the respective load 18, 18' or the respective store 19, 19', respectively, when the dynamo winding 16, 16' is activated. Provided that such a store 19, 19' is used and, depending on the nature of the load 18, 18', a converter circuit, which is not shown here, can expediently be connected upstream of the store 19, 19' or the load 18, 18', respectively.

The motor controller 4 is now coupled to the respective switching means 17, 17'. For this purpose, a corresponding control line 20 or 20', respectively, can be provided, which connect the respective switching means 17, 17' to a corresponding control means 21 of the machine controller 4. The transformer controller 14 can thereby be integrated into the inverter means 11. The control means 21 can thereby be integrated into the inverter means 11. The control means 21 can in particular be configured so that it controls the inverter means 11 via a corresponding control line 22. The control means 21 can further monitor the proper function of the synchronous machine 1. The control means 21 can in particular detect the occurrence of a, preferably defined, machine fault, which triggers the deactivation of the synchronous machine 1. A machine error can be, for example, a short circuit in one of the stator coils 9.

The machine controller 4 or the control means 21 thereof, respectively, is now configured so that when a machine fault occurs, the supply of electrical energy to the respective stator coil 9 and to the respective transformer primary coil 10 is ended on the one hand and, synchronously thereto, controls the respective switching means 17, 17' to activate the demagnetizing circuit 15, 15' or the respective dynamo winding 16, 16', respectively, on the other hand. In the case of activated demagnetizing circuit 15, 15', the rotor field induces electrical voltage in the respective dynamo winding 16, 16', which is then supplied to the respective load 18, 18' or the respective store 19, 19', respectively, as electrical energy within the demagnetizing circuit 15, 15'. The rotor 2 or the respective rotor coil 5, respectively, is demagnetized thereby. Supercritical voltages and currents within the synchronous machine 1 can be avoided thereby. An overheating of electronic components can also be avoided thereby. During normal operation of the synchronous machine 1, the motor controller 4 or the control means 21, respectively, controls the switching means 17, 17' to deactivate the demagnetizing circuit 15, 15' or the respective dynamo winding 16, 16', respectively.

In the case of the one variation of the demagnetizing circuit 15 shown in FIG. 1, the respective dynamo winding 16 is arranged on the respective stator coil 9 radially on the inside. The respective dynamo winding 16 is thereby located quasi radially between the rotor 2 and the stator 3. In the case of the other variation of the demagnetizing circuit 15' shown in FIG. 1, the dynamo winding 16' is arranged on the respective stator coil 9 radially on the outside. The respective dynamo winding 16, 16' can thereby be wound with a winding of the stator coil 9 and/or can be wound onto the same pole shoe, onto which the respective stator coil 9 is wound as well.

In the example of FIG. 1, the synchronous machine 1 is designed in a multi-phase manner, namely in a three-phase manner. The three phases are thereby identified with U, V and W. At least one stator coil 9 is assigned to each of these phases U, V, W. In the example of FIG. 1, a coil pair of two stator coils 9 lying diametrically opposite one another is assigned to each phase U, V, W. Six stator coils 9 are thus provided here. Six dynamo windings 16 or 16', respectively, are then accordingly also provided. Expediently, all dynamo windings 16, 16' are connected in a common demagnetization circuit 15, 15'. A common switching means 17, 17' can then be provided to activate and deactivate the dynamo windings 16, 16'. It is likewise conceivable to provide several switching means 17, 17'. It is in particular conceivable to assign a separate switching means 17, 17' to each dynamo winding 16, 16'. Expediently, all dynamo windings 16, 16' are jointly assigned to the respective load 18, 18' or the respective store 19, 19', respectively. A common load 18, 18' or a common store 19, 19', respectively, is then preferably used, to which all dynamo windings 16, 16' are assigned.

Expediently, the respective load 18, 18' or the respective store 19, 19', respectively, is arranged on the stator 3 on the outside or outside of the stator 3, respectively. A stator housing 23, in which the stator windings 9 are arranged, is suggested in FIG. 1. The respective load 18, 18' or the respective store 19, 19', respectively, can now be arranged on this stator housing 23 on the outside.

When the machine error occurs, the motor controller 4 or the control means 21, respectively, can end the supply of electrical energy to the respective stator coil 9 and in particular also to the respective transformer primary coil 10. When the machine error occurs, the machine controller 4 or the control means 21, respectively, can essentially control the respective switching means 17, 17' simultaneously to activate the respective dynamo winding 16, 16' or the respective demagnetizing circuit 15, 15', respectively. The machine controller 4 or the control means 21, respectively, can optionally short-circuit at least the stator coils 9 to end or when ending, respectively, the supply of the electrical energy to the respective stator coil 9 or to the respective transformer primary coil 10, respectively. A short circuit of the respective transformer primary coil 10 is also conceivable.

The invention claimed is:

1. An inductively electrically excited synchronous machine, comprising:
   a rotor including at least one rotor coil for generating a magnetic rotor field,
   a stator, on which the rotor is rotatably mounted about an axis of rotation, the stator including at least one stator coil for generating a magnetic stator field,
   a rotary transformer for inductively transmitting electrical energy to the at least one rotor coil, the rotary transforming including at least one stator-fixed transformer primary coil and at least one rotor-fixed transformer secondary coil, wherein the at least one transformer secondary coil serves for inductively transmitting electrical energy to the at least one transformer secondary coil, and the at least one transformer secondary coil serves for supplying the at least one rotor coil with electrical energy,
   a machine controller coupled to the at least one stator coil and to the at least one transformer primary coil for operation as a motor and/or as a generator,
   a demagnetizing circuit including at least one dynamo winding arranged on the stator, wherein the demagnetizing circuit has at least one switching device for activating and deactivating the demagnetizing circuit, wherein the demagnetization circuit has at least one electrical energy load and/or at least one electrical energy store, which is connected via the switching device to the at least one dynamo winding such that electrical energy fed in at the at least one dynamo winding by induction is supplied to the at least one load and/or the at least one store in the case of activated demagnetizing circuit, wherein the machine controller is coupled to the switching device and is configured so that the machine controller controls the switching device to deactivate the demagnetization circuit during a normal operation and the machine controller controls the switching device to activate the demagnetizing circuit in the event of a machine fault, and wherein the at least one load and/or the at least one store is/are arranged on the stator on the outside or outside of the stator.

2. The synchronous machine according to claim 1, wherein the demagnetizing circuit has several dynamo windings that are arranged on the stator so as to be distributed in a circumferential direction.

3. The synchronous machine according to claim 1, wherein the demagnetizing circuit has one dynamo winding each for each stator coil and arranged on the stator so as to be distributed in a circumferential direction.

4. The synchronous machine according to claim 1, wherein the demagnetizing circuit has the at least one dynamo winding for each stator coil, which is arranged on the at least one stator coil.

5. The synchronous machine according to claim 4, wherein the at least one dynamo winding is arranged on the at least one stator coil radially on an inside.

6. The synchronous machine according to claim 4, wherein the at least one dynamo winding is arranged on the at least one stator coil radially on an outside.

7. The synchronous machine according to claim 1, wherein the synchronous machine is a multi-phase configuration, wherein at least one stator coil is assigned to each phase.

8. The synchronous machine according to claim 1, wherein the synchronous machine is a one-phase configuration or a multi-phase configuration, wherein a coil group of several stator coils or a coil pair of two stator coils lying diametrically opposite one another is assigned to each phase.

9. The synchronous machine according claim 1, wherein the at least one load has at least one thermocouple, which converts electrical energy into heat.

10. The synchronous machine according to claim 1, wherein the machine controller ends the supply of electrical energy to the at least one stator coil and/or to the at least one transformer primary coil in the event of the machine fault.

11. The synchronous machine according to claim 1, wherein the machine controller short-circuits the at least one stator coil and/or the at least one transformer primary coil when ending or to end the supply of electrical energy to the at least one stator coil and/or to the at least one transformer primary coil.

12. The synchronous machine according to claim 1, wherein:

the stator has several stator coils, to which a respective dynamo winding is assigned in each case, and the at least one load and/or the at least one store is/are assigned to several dynamo windings or to all dynamo windings jointly.

13. The synchronous machine according to claim 1, wherein:

the stator has several stator coils, to which a respective dynamo winding is assigned in each case, and the switching device is assigned to several dynamo windings or to all dynamo windings jointly.

* * * * *